(12) United States Patent
Ferlitsch et al.

(10) Patent No.: US 7,133,166 B2
(45) Date of Patent: Nov. 7, 2006

(54) SCAN TO CLUSTER PRINT STRUCTURE AND METHODOLOGY

(75) Inventors: Andrew R. Ferlitsch, Tigard, OR (US); Roy K. Chrisop, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 874 days.

(21) Appl. No.: 10/256,361

(22) Filed: Sep. 26, 2002

(65) Prior Publication Data

US 2004/0061909 A1    Apr. 1, 2004

(51) Int. Cl.
*H04N 1/04* (2006.01)
(52) U.S. Cl. .................. 358/474; 358/1.15; 358/468; 358/400; 382/112; 382/1.13; 382/442
(58) Field of Classification Search .............. 358/1.15, 358/468, 400, 1.13, 1.18, 442; 382/112
See application file for complete search history.

(56) References Cited

U.S. PATENT DOCUMENTS

| | | | |
|---|---|---|---|
| 5,212,566 A * | 5/1993 | U et al. ...................... | 358/444 |
| 5,996,503 A | 12/1999 | Woodall et al. ............. | 102/498 |
| 6,100,994 A | 8/2000 | Schliekelmann et al. .. | 358/1.15 |
| 6,421,135 B1 * | 7/2002 | Fresk et al. ................. | 358/1.15 |
| 6,449,054 B1 * | 9/2002 | Cox et al. ................... | 358/1.15 |
| 6,473,811 B1 * | 10/2002 | Onsen ......................... | 710/15 |
| 6,980,312 B1 * | 12/2005 | Czyszczewski et al. ... | 358/1.15 |

* cited by examiner

*Primary Examiner*—Douglas Q. Tran
*Assistant Examiner*—Negussie Worku
(74) *Attorney, Agent, or Firm*—Jon M. Dickinson PC; Robert D. Varitz PC

(57) ABSTRACT

A document printing system and methodology wherein plural, potentially useable printers are reviewed in a preliminary discovery process to assess (1) which ones are currently available for use, and (2) of these, which have the best-suited operational characteristics relative to a particular printing job. The latter "collection" of printers is then treated as a cluster to which a scanned document is appropriately sent for implementation of that job.

5 Claims, 9 Drawing Sheets

SCAN TO CLUSTER PRINT STRUCTURE AND METHODOLOGY

BACKGROUND AND SUMMARY OF THE INVENTION

This invention relates to printing a document from a scanner which has scanned in that document, and more particularly to printing such a document utilizing multiple printers organized into a selected cluster of appropriate, available printers which have an operative connection to such a scanner.

The present invention specifically addresses the issue of implementing a high volume of documentary printing of scanned images through a system, and a methodology, which allow for a scanned image to be directed for printing to a currently selected cluster of a plurality of printers that have been identified as being currently available for use, and which have been found to possess appropriate characteristics for the particular printing job.

The invention thus proposes, for the first time, a system which can be described as including (1) a scanner for scanning in images that are to be printed, (2) appropriate control structure connected to, or part of, that scanner for performing an enhanced discovery function that enables detection of the availabilities, identities, and operating characteristics of a plurality of available printers, and (3) an appropriate population of printers from which a operative cluster can be selected for use. The fundamental methodology of the invention can be expressed as a process which utilizes the performances of these three systemic elements, namely, a scanner, a control structure as generally described, and an available population of potentially selectable printers. Cluster selection according to the invention is very flexible, and is definitively variable from print-job to print-job.

Various manners of implementing and specifically structuring the system and methodology of this invention will become more fully apparent as the description which now follows is read in conjunction with the accompanying drawings.

DESCRIPTION OF THE DRAWINGS

FIG. 7 is a block/schematic diagram illustrating an embodiment of the invention wherein printer-capability discovery is performed by manual user activity utilizing a screen menu display presented on the screen in a scanner.

FIG. 8 is a block/schematic diagram illustrating manual selection of print-option instructions performed manually with respect to information presented on the screen of a printer in accordance with the invention.

DETAILED DESCRIPTION OF, AND MANNER OF PRACTICING, THE INVENTION

Figure 1:
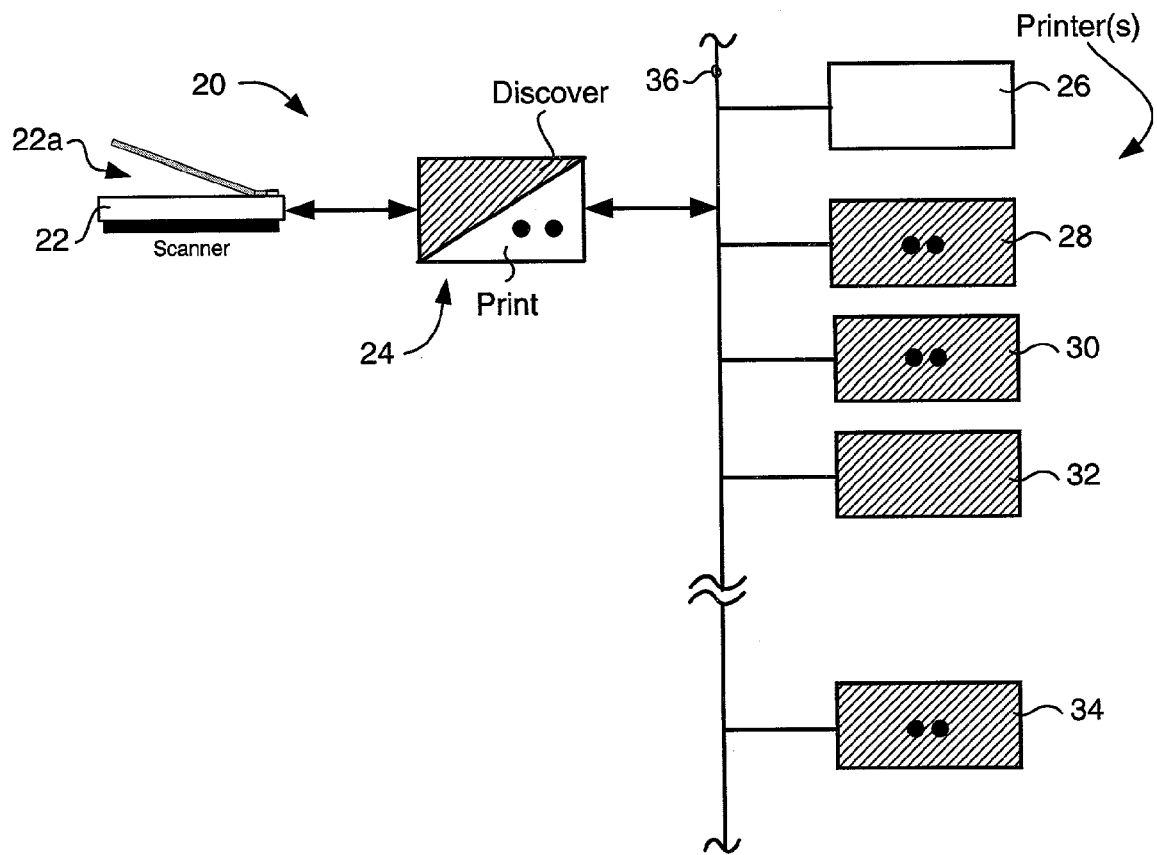
FIG. 1 is schematic block diagram generally illustrating, in a broad-expression manner, principal structures and a methodology which are brought together for performance in accordance with the features of this invention.

Turning attention now to the drawings, and looking first of all at FIG. 1, here there is indicated generally at 20 a scan-to-cluster document printing system which is constructed, and which performs, in accordance with the present invention. Included in system 20 is a scanner 22 having a document scanning station 22a, control structure 24 which is operatively connected to scanning station 22a and which functions herein to acquire certain data relative to printers that can be operatively connected to scanner 22, and a plurality of printers, such as printers 26, 28, 30, 32, 34 which are operatively connected to structure 24 through a network connection shown generally at 36. Control structure 24 is also referred to herein as cluster-data-acquisition substructure.

While in FIG. 1 control structure 24 is shown as a block which is separated from scanner 22, it will become apparent from the description which follows below that this control structure may be indeed be external to a scanner, such as scanner 22, but it may also actually be a portion of and within a scanner, such as scanner 22.

A detailed description of different manners of practicing the present invention will follow shortly herein, but first, one can see and understand generally the structure and operation of the system of this invention completely with respect to what is shown in FIG. 1. At the beginning of a job printing operation, a document is scanned at station 22a by scanner 22. Thereafter, by one of several different specific approaches, control structure 24 initiates what is referred to herein as an enhanced discovery operation which is aimed initially at gaining the identities and addresses of all potentially available printers, such as printers 26–34, inclusive. With respect to identified "available" printers, the discovery operation goes on to assess their respective, individual performance capabilities, such as printing speed, color or non-color capability, stapling ability, collating capability, etc.

The first portion of the discovery procedure just mentioned is implemented to gain a report back from all printers operatively connectable to scanner 22, and which, at the moment of inquiry, can report that they are available for use. An availability report can include reference to such conditions as (1) Online, (2) Online and Ready, (3) Online, Ready and NOT Power Save, and (4) all. This portion of the operation of control structure 24 is represented by the shaded area bounded along its lower side by a diagonal line in FIG. 1, within the block which represents structure 24.

In the illustration which is now being given, of all of the potentially available printers among the group of printers illustrated, only printers 28, 30, 32, 34 return a report of availability. This availability report is symbolized by shading which is presented in the blocks that represent these four printers, which shading substantially matches that just referred to within the upper diagonally divided portion of the block representing control structure 24.

A subsequent phase of discovery, undertaken relative to the "available" printers, is performed by control structure 24 to assess the respective capabilities of these four printers which have so reported availability. Specifically, these potentially available printers are polled to gain capability information, in order to determine which, among them, can appropriately be organized, for the purpose of the particular print job at hand, into a cluster of printers that are both available and which have appropriate capabilities.

This inquiry about capability characteristics is represented by the diagonally separated, "clear" region of block 24 which contains two large black dots. The printers among the four which reported availability, and which also report characteristics that are indeed appropriate, include only three of the four reporting printers, and namely printers 28, 30, 34. Accordingly, the blocks representing these three printers contain pairs of large black dots.

With this discovery process complete, the print job is now effectively sent for completion by an organized cluster of printers including the three printers designated 28, 30, 34.

Each time that a print job is undertaken, this very same kind of discovery practice takes place so that, for each such job, all available printers are identified, and among those which report availability, the ones most suited by their capabilities, are selected and are organized into a job-specific cluster for handling the job as a group. The invention, in its practice, thus offers substantial flexibility. Some of the discovery information may be cached, such as capabilities (some or all), and thus not necessarily rediscovered during later discovery activities.

FIGS. 2–17, inclusive, are now discussed to elaborate various organizations and procedures which specifically illustrate operation of the system represented in FIG. 1. The respective contents of FIGS. 2–17 inclusive, are fully self-expository with regard to illustrating the method and system of the present invention.

Figure 2:
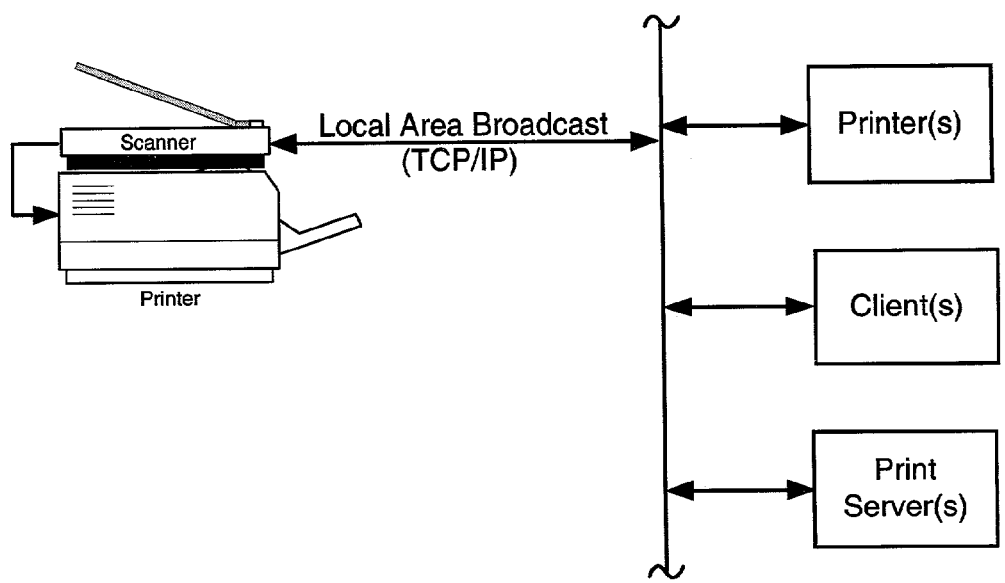
FIG. 2 is a block/schematic diagram of one embodiment of the system of the invention illustrating the performance of printer-availability discovery by structure implemented within the body of a scanner per se.

FIG. 2 illustrates that portion of printer discovery which involves gaining the identities of potentially available printers, i.e., those printers which can report that they are currently available. This discovery, as pictured in FIG. 2, is implemented utilizing a local area network broadcast approach initiated and conducted by control structure, such as that represented by block 24 in FIG. 1, which control structure is resident within a scanner, such as scanner 22. In this arrangement, the scanner sends a local area broadcast requesting that each potentially available device which receives the broadcast respond and identify itself. The response contains, but is not limited to the responding device's network address, and the response which is received is appropriately grouped, by operation of the control structure, into a potential cluster for use. Control structure 24 may subsequently query the responding devices from the local area broadcast to identify those devices that are printers.

Figure 3:
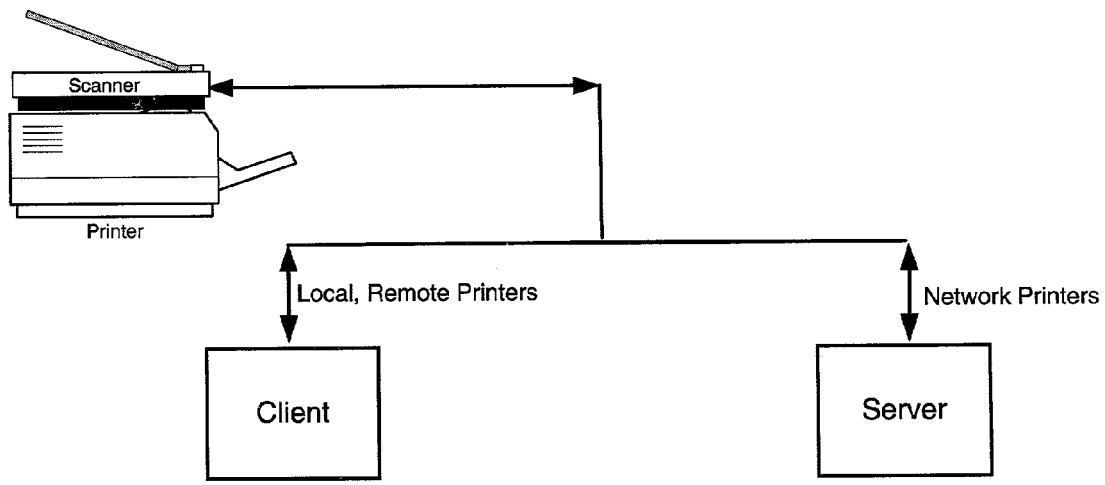
FIG. 3 is a block/schematic diagram of an embodiment of the invention in which printer discovery, according to the invention, is invoked in a device, such as a client computer, which is external to a scanner.

FIG. 3 illustrates this same category of printer discovery utilizing structure external to a scanner, such as one or more external client computing devices and/or print servers. The available client computing devices and/or print servers may have been identified by a local area broadcast approach, such as that just mentioned above, or by any other suitable conventional manner and/or means. For each client device or server, there is returned a list of printers locally or network installed from which a cluster of printers may be selected.

Figure 4:
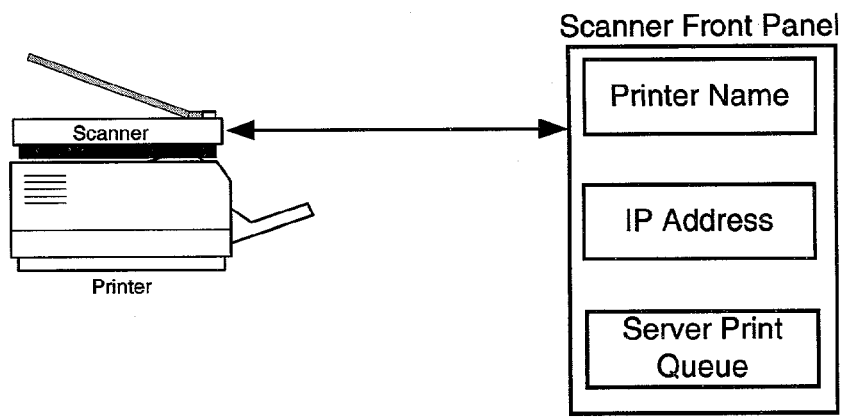
FIG. 4 is a block/schematic diagram illustrating a modification of the invention wherein printer discovery is invoked manually by control steps performed by a user of a scanner in accordance with the invention.

FIG. 4 illustrates another embodiment of the system of the invention wherein the scanner employed may be used to obtain a list of available printing devices by manual input from a user at the front panel of the scanning device, or in relation to a screen presentation offered by that device.

Figure 5:
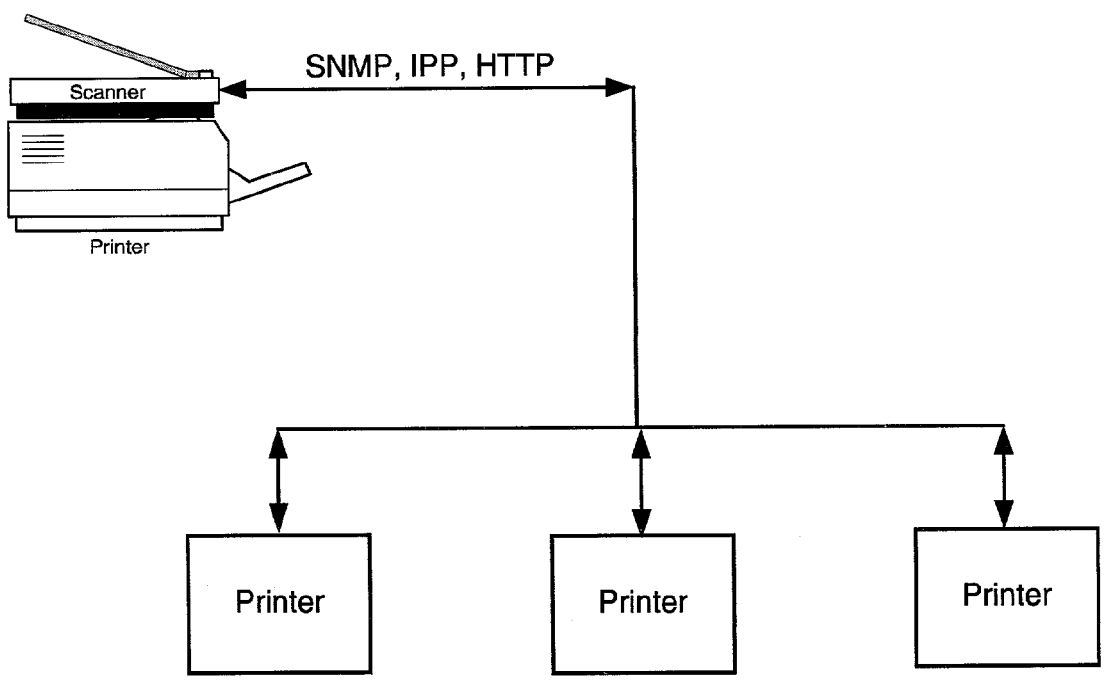
FIG. 5 is a block/schematic diagram illustrating an embodiment of the system of this invention, and of its methodology, wherein discovery of specific printer capabilities is performed by structure resident within a scanner per se.

FIG. 5 illustrates that portion of printer discovery which involves assessing printer capabilities. Here, once the operative scanning device has discovered potentially available printing devices, the scanning device, under the influence of control structure 24 resident within it, requests reports regarding the capabilities from each identified printing device. These capabilities may include, but are not limited to, capabilities known as duplex, copy, collate, face-up, stapling, hole-punch, color, PDL interpreters, and others.

Figure 6:
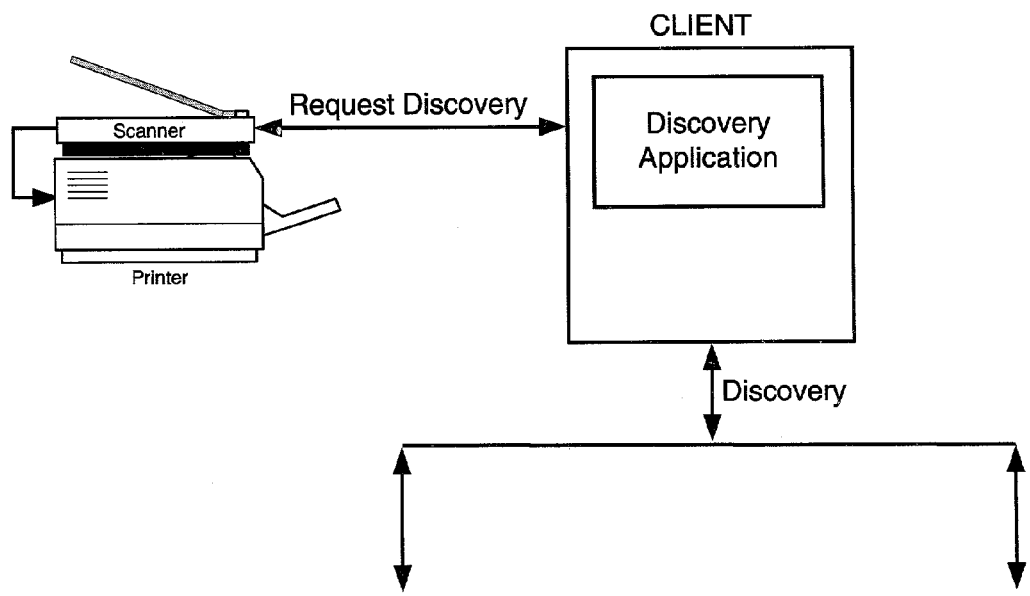
FIG. 6 is a block/schematic diagram illustrating an embodiment of the system wherein printer-capability discovery is performed by a device, such as a client computer, which is external to a scanner.

FIG. 6 illustrates initial available printer identification utilizing a remote client device, such as computer. In such a situation, an appropriate discovery application is installed on the client device, which aids in developing, for the scanner, an operative list of potentially available printers and capabilities. The discovered list is returned and reported to the connected scanning device.

Figures 7, 8:
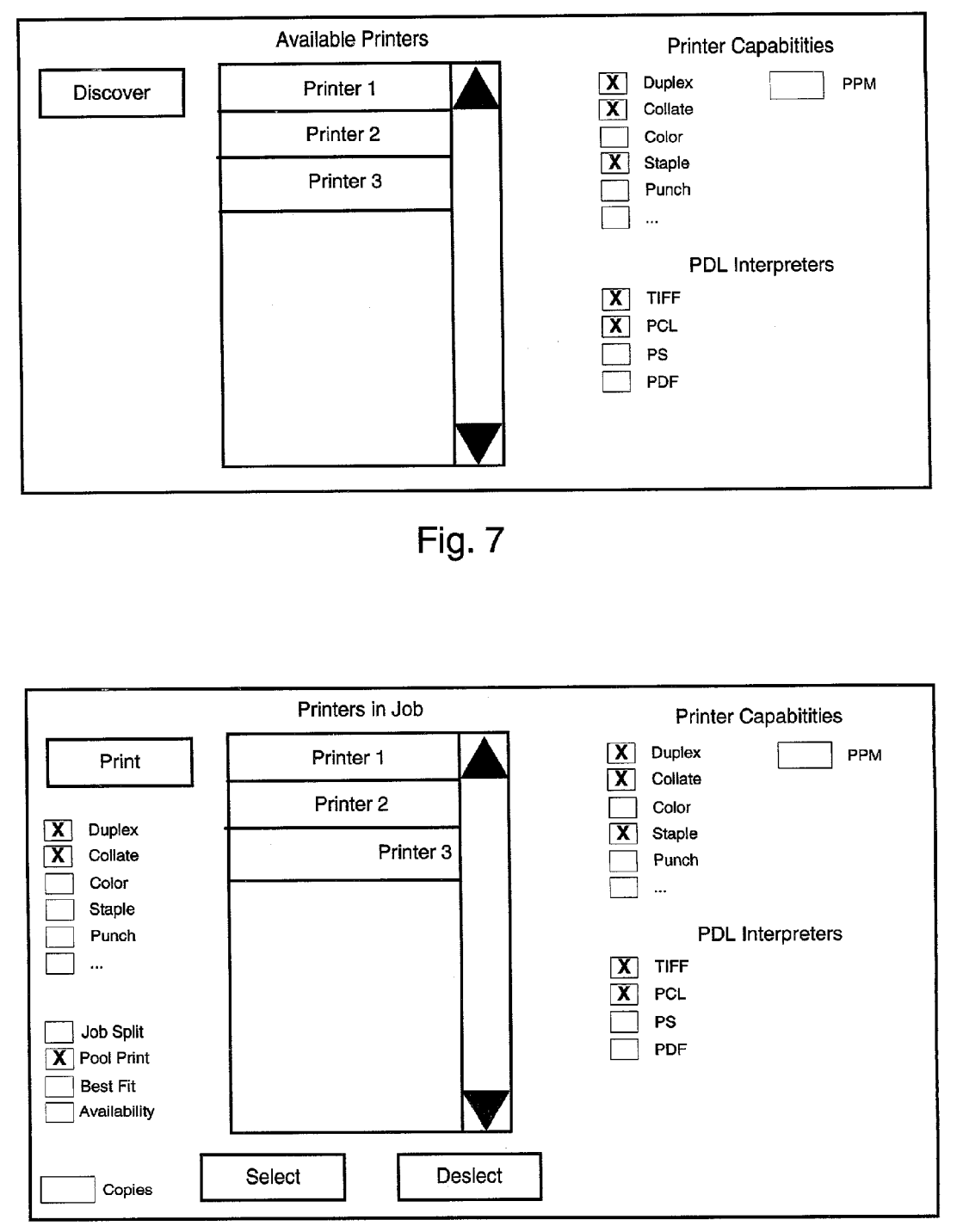

FIG. 7 illustrates user implementation of the discovery process from, for example, the front panel on the scanning device. In this arrangement, the user selects a discover selection, such as by a button imaged on a display screen in the scanning device. Upon completion of the initial discovery process, a list of the discovered printers is displayed to the user, such as by a scrolling list on the scanner screen.

FIG. 8 illustrates user initiation of the printing process, and namely sending of the scanned images in a print job to printers organized into a cluster, with the user initiating such printing directly from the from panel of the particular scanning device. Here, the user selects various print options, such as the number of copies, duplex, color, collation, staple, punch, etc., and then initiates a command to send the print job to the selected printers.

Figure 9:
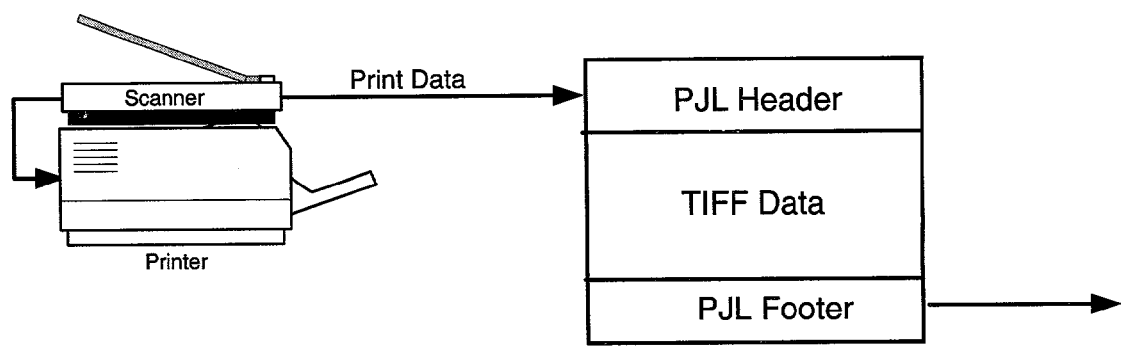
FIGS. 9 and 10 illustrate print-data generation in accordance with operation of the system of the invention where the output format of scanned image is in TIEF format.
Figure 10:
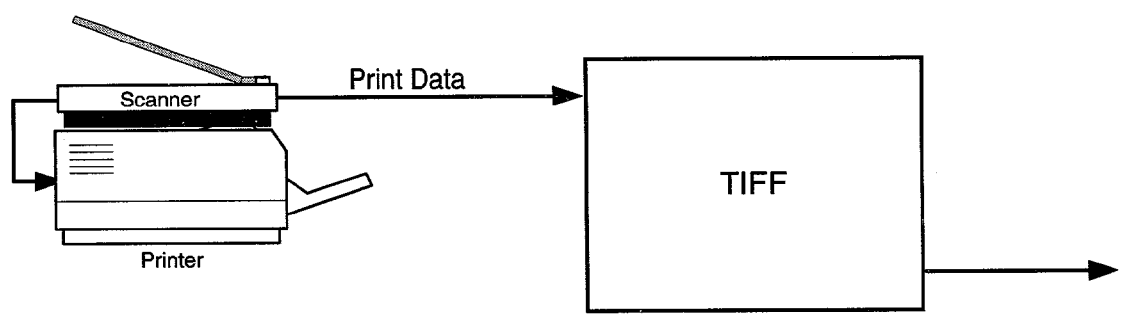

FIGS. 9 and 10 illustrate print-data generation in accordance with operation of the system of the invention where the output format of scanned images is, for example, in the TIFF format.

Figure 11:
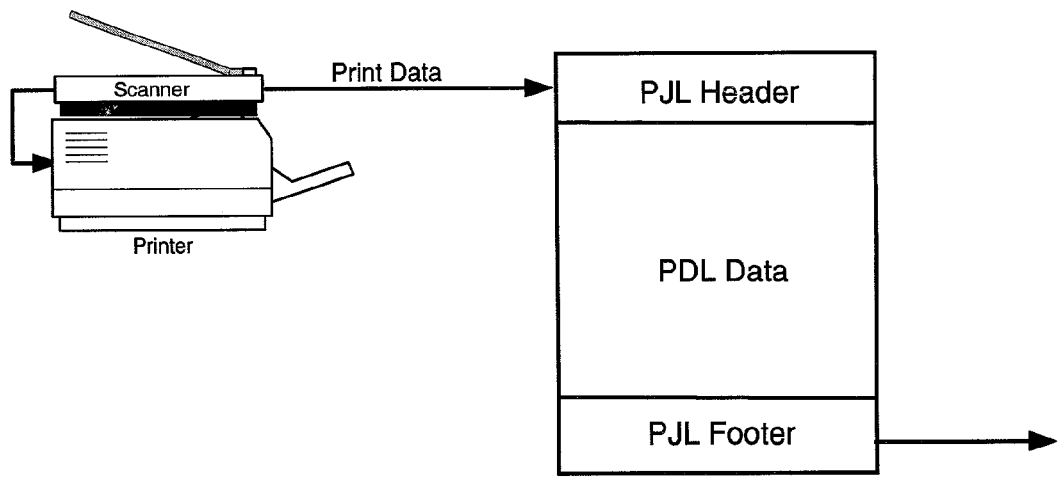
FIG. 11 illustrates print-data generation in accordance with the invention utilizing a PDL format.

FIG. 11 illustrates print-data generation employing the PDL data format.

Figure 12:
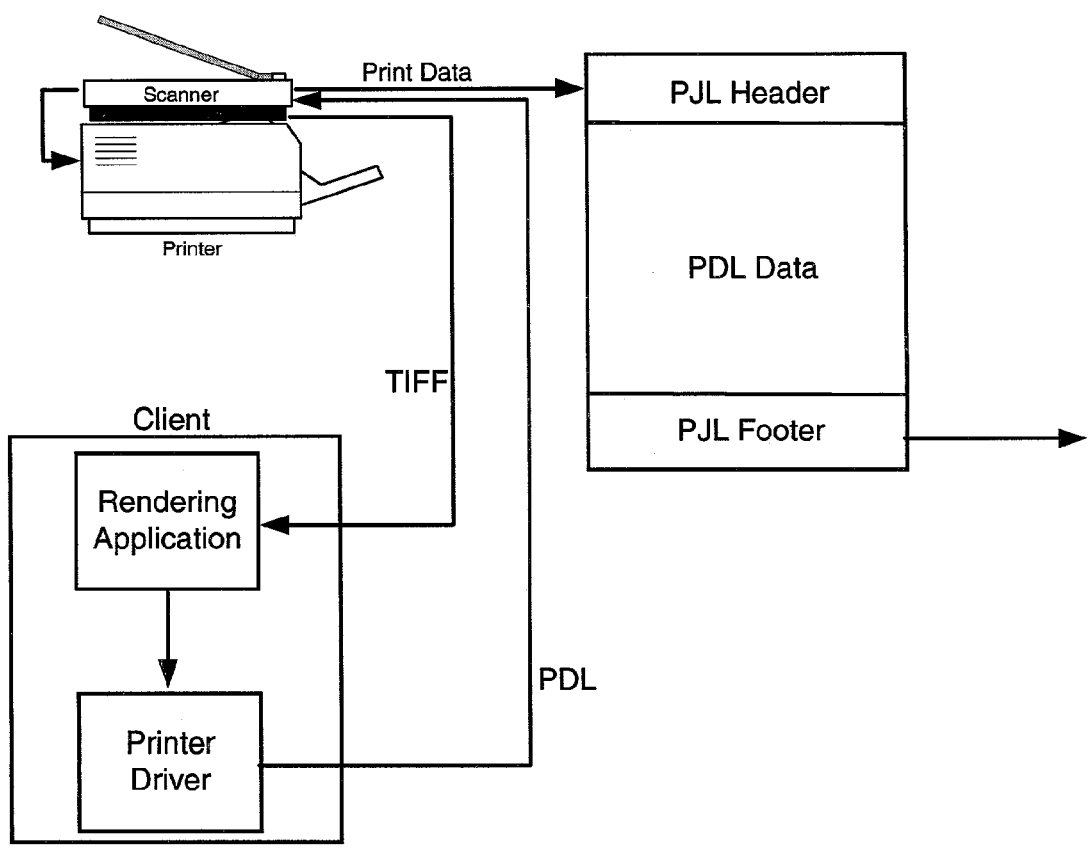
FIG. 12 illustrates rendering of scanning-image data in accordance with practice of the invention, such being performed by a device external to a scanner, such as a client computer.

FIG. 12 illustrates print-data generation via client-device rendering of data in a conventional fashion.

Figure 13:
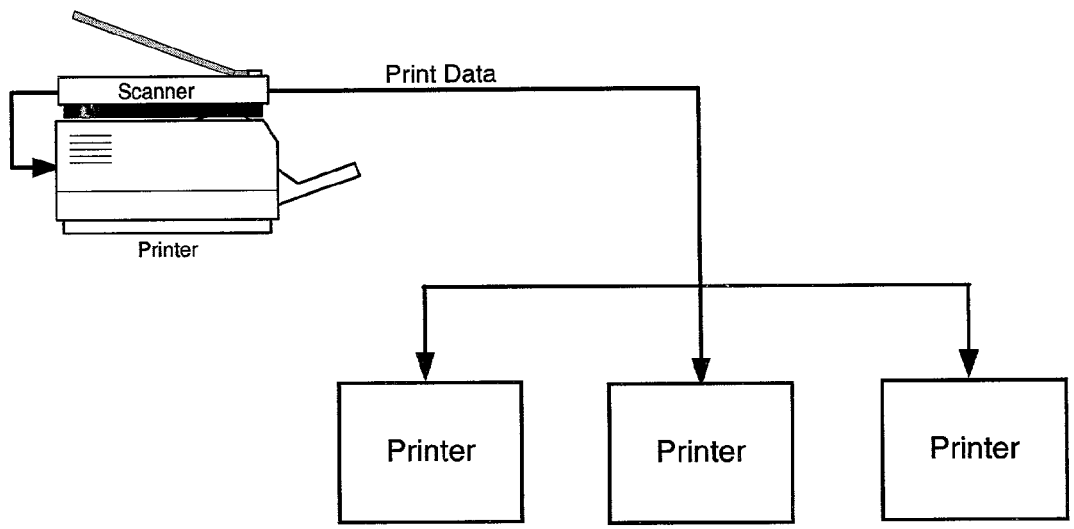
FIG. 13 illustrates the establishment of a peer-to-peer connection between a scanner and printing devices in accordance with practice of the present invention.

FIG. 13 illustrates peer-to-peer print-data management in an arrangement wherein the scanning device establishes a peer-to-peer connection with cluster-selected printing devices, and appropriately delivers a print job to these devices.

Figure 14:
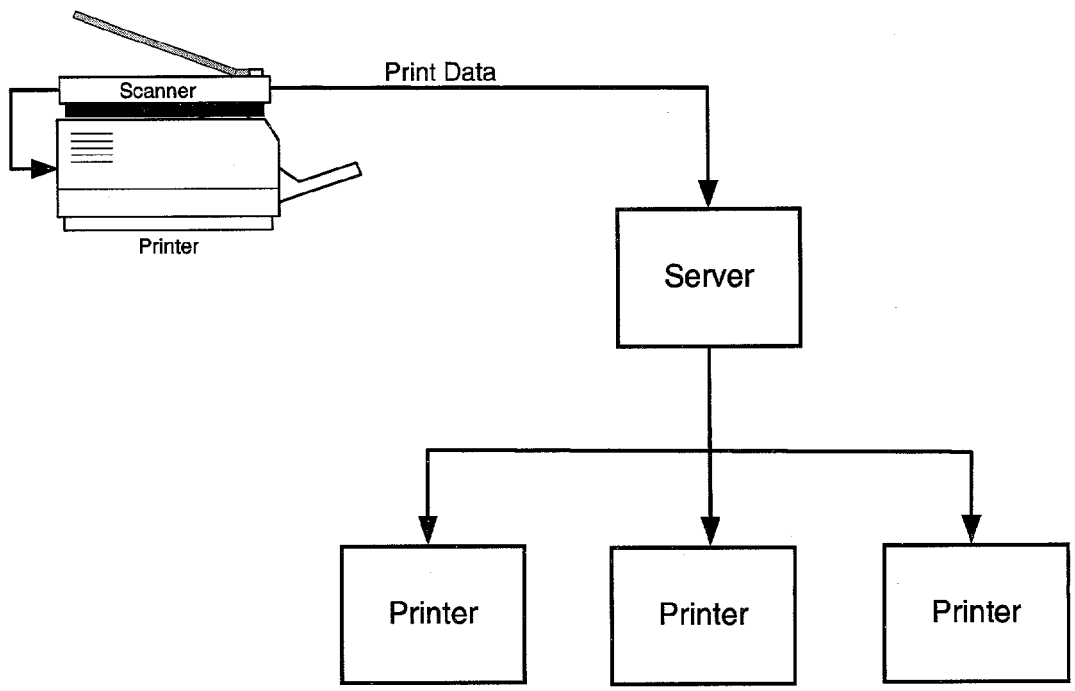
FIG. 14 illustrates print-data handling via a print server which possesses an established connection with a scanner, and which functions to implement distribution of a print job to a selected cluster of plural printers in accordance with practice of the present invention.

FIG. 14 illustrates another approach wherein print data is distributed to cluster-selected printers through the operation of an external print server.

Figure 15:
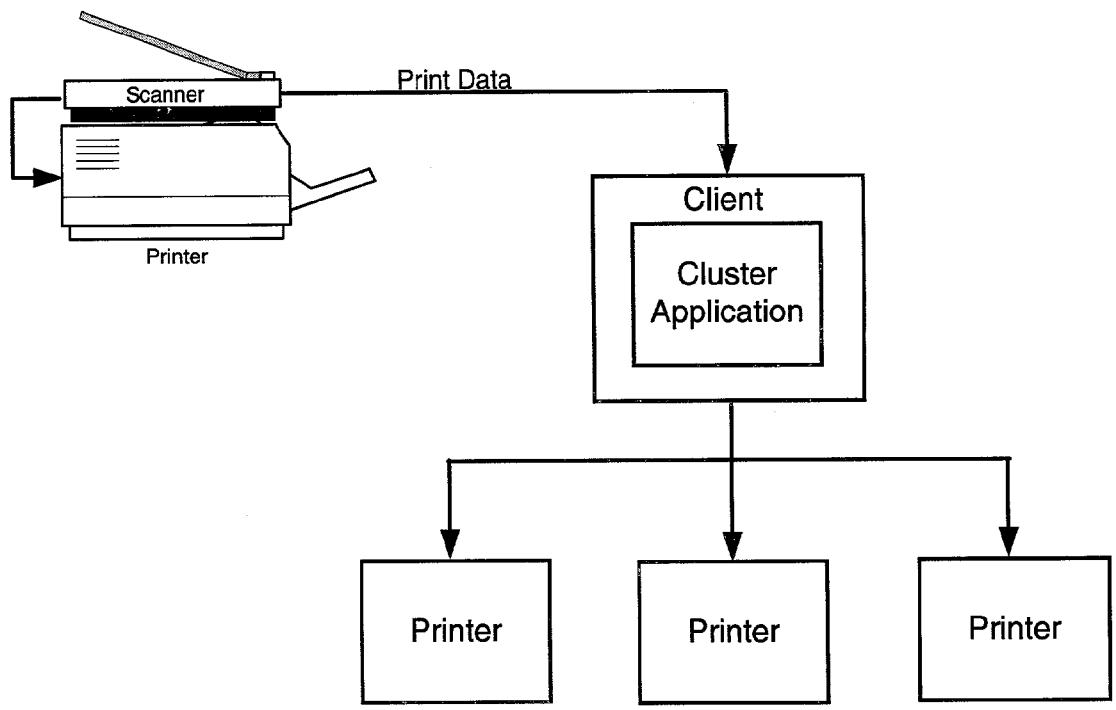
FIG. 15 is a block/schematic diagram illustrating despooling of print data utilizing a client surrogate device, such as a computer, connected appropriately to a scanner, with components and processes all behaving in accordance with practice of cluster-printing selection performed by the present invention.

FIG. 15 illustrates an approach wherein the scanning device illustrated establishes a connection with a client computing device which is acting on the scanning device's behalf, and where an appropriate printing application is installed on the client computing device. Through operation of this client computing device and the installed application, a selected print job is sent to the previously cluster-organized group of plural printers.

Figure 16:
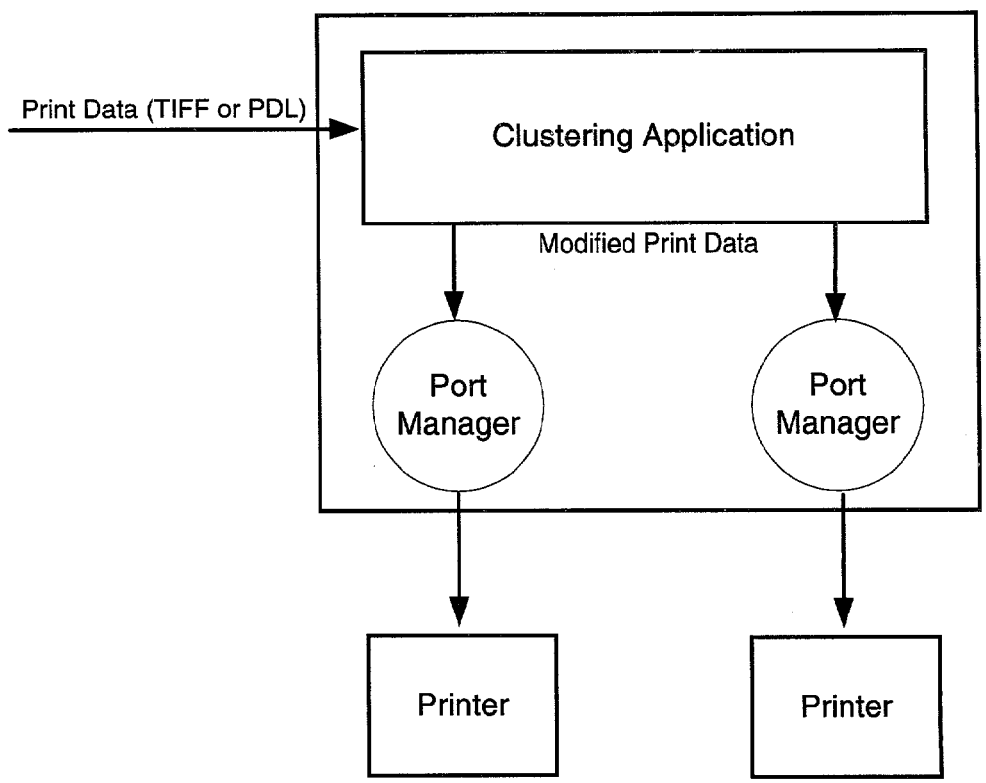
FIG. 16 is a block/schematic diagram illustrating the transmission of print data to a plurality of cluster-selected printers directly via the operation of a client surrogate device, such as a computer, and with all devices performing in accordance with practice of the present invention.

FIG. 16 illustrates the management of print data utilizing a client surrogate device which implements a direct-to-printer flow of print data as illustrated.

Figure 17:
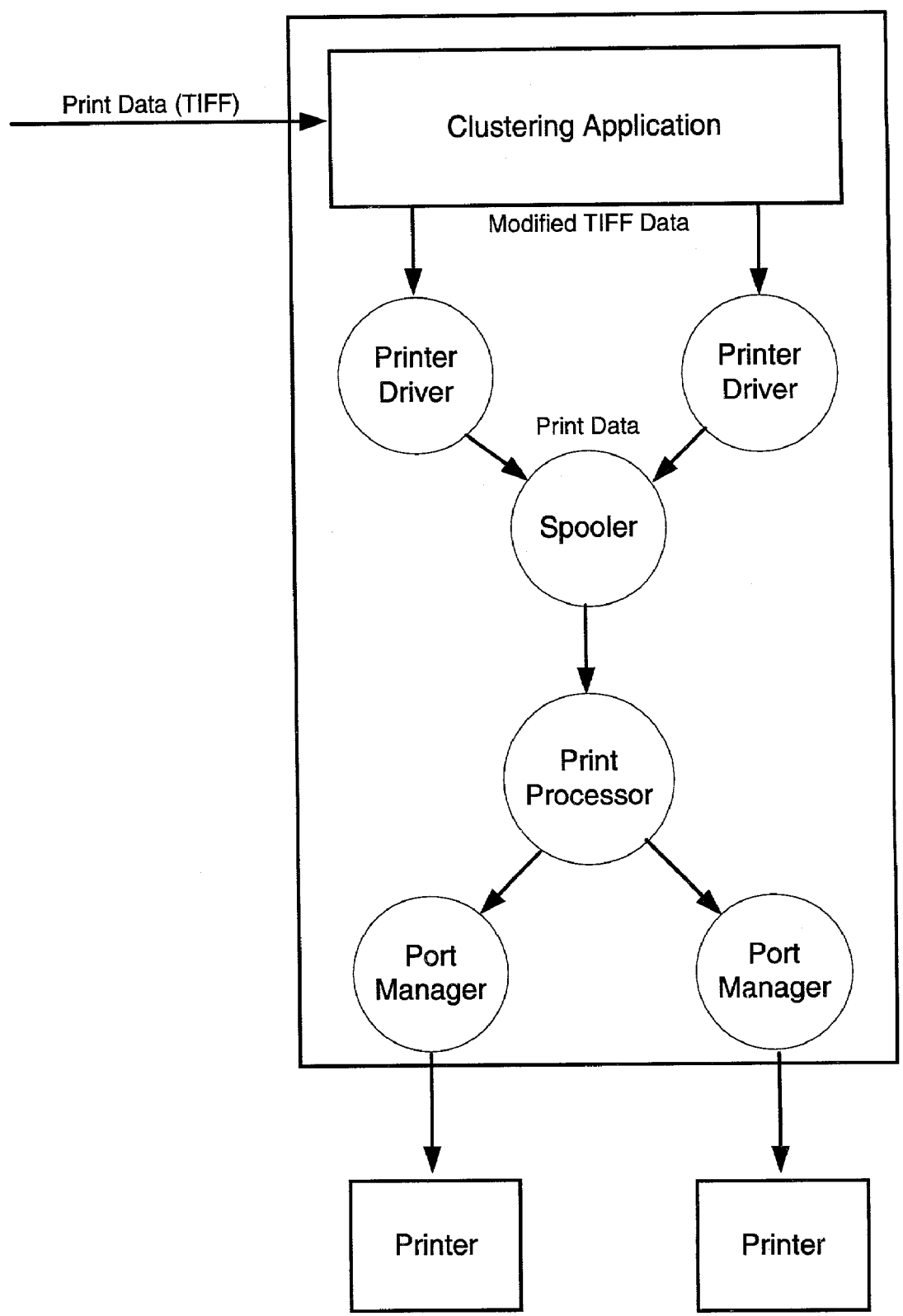
FIG. 17 is a block/schematic diagram illustrating rendering of print data on its way to a cluster of selected printers under the influence of a client surrogate device, such as a printer which is separate from a scanner.

FIG. 17 illustrates the flow management of print data employing an external client surrogate device which performs rendering and distribution of the print-job-to-cluster-selected printers, as is clearly illustrated by the flow diagram presented in FIG. 16.

It will thus be apparent that a novel scan-to-cluster printing system and methodology are proposed by the present invention. Fundamentally, the invention rests upon a concept which involves invoking an enhanced discovery process for assessing, first of all, the identities and addresses of potentially available ones of plural printers that are operatively connectable to a scanner which has scanned in an image that is intended to be printed. This initial discovery process is followed up, in accordance with the invention, by an inquiry directed to the "availability-reporting" printers to assess their respective printing capabilities, all for the purpose of matching up these capabilities with a print-job set of requirements. Those that have the appropriate requirements are organized into a cluster of selected printers for the purpose of the specific job. Then, in one of many different otherwise conventional processes, print data is created and delivered appropriately to the cluster-selected printers.

While several embodiments of the methodology and system of the present invention have been disclosed, illustrated and described herein, it is appreciated that variations and modifications may be made without departing from the spirit of the invention.

We claim:

1. A multi-copy print-job handling method performed in a networked printing system comprising utilizing a networked scanner in the system, initiating a print job by scanning a document which to be printed, following said initiating by scanning, in a pair of sequenced request phases, and in direct relation to the nature of the initiated print job, requesting certain job-relevant return information from a population of networked printers in the system, which printers are yet uncommitted to reception of the job from the scanner, such information including, relative to one request phase in the sequence of request phases, current printer availability, and relative to another request phase in the same sequence of request phases, printer capabilities, based upon receipt of such requested return information, forming from the population of networked printers a selected-printer cluster of plural printers suitable for performing simultaneous multi-copy-printing of the initiated print job, and sending, effectively from the print-job-initiating scanner to each of the printers in the selected-printer cluster, a respective printer-compatible version of the initiated print job.

2. The method of claim 1, wherein the mentioned one and other sequenced request phases are performed in the printing system by a system-included cluster-data-acquisition structure which is interposed the networked scanner and the networked printers.

3. The method of claim 2, which further comprises utilizing the cluster-data-acquisition structure to detect document splitting ability.

4. The method of claim 2, which further comprises utilizing the cluster-data-acquisition structure to detect color/black-and-white separation ability.

5. The method of claim 2, which further comprises utilizing the cluster-data-acquisition structure to detect the opportunity to broadcast a print-job to all networked printers.

* * * * *